United States Patent [19]

Taylor

[11] 4,303,683

[45] Dec. 1, 1981

[54] METHOD FOR SKINNING ANIMAL TONGUE

[75] Inventor: Robert E. Taylor, Glenview, Ill.

[73] Assignee: Swift & Company, Chicago, Ill.

[21] Appl. No.: 159,361

[22] Filed: Jun. 13, 1980

[51] Int. Cl.³ .................................................. A23L 1/31
[52] U.S. Cl. .......................................... 426/264; 17/50;
426/281; 426/404; 426/407; 426/480; 426/641;
426/646; 426/652
[58] Field of Search ............... 426/264, 265, 266, 281,
426/315, 574, 576, 641, 646, 652, 404, 407, 480,
479, 332; 17/46, 50, 51

[56] References Cited

U.S. PATENT DOCUMENTS

| | | | |
|---|---|---|---|
| 223,106 | 12/1879 | Black | 426/480 X |
| 1,212,614 | 1/1917 | Doran | 426/281 |
| 2,224,399 | 12/1940 | Komarik | 426/407 X |
| 2,299,946 | 10/1942 | Alkire | 426/480 X |
| 2,331,467 | 10/1943 | Griffith et al. | 426/407 X |
| 2,596,067 | 5/1952 | Brissey | 426/281 X |
| 2,903,366 | 9/1959 | Barnett | 426/266 |
| 3,000,742 | 9/1961 | Kuster | 426/641 X |
| 3,075,843 | 1/1963 | Maas et al. | 426/641 X |
| 3,556,807 | 1/1971 | Woo | 426/641 |
| 3,580,725 | 5/1971 | Kuster | 426/641 |
| 3,934,044 | 1/1976 | Busch et al. | 426/332 X |
| 3,997,672 | 12/1976 | Stead et al. | 426/646 X |

*Primary Examiner*—Arthur L. Corbin
*Attorney, Agent, or Firm*—Charles E. Bouton

[57] ABSTRACT

Trimmed animal tongues are soaked in unheated edible acid, precooked in hot edible acid and then skinned.

14 Claims, No Drawings

METHOD FOR SKINNING ANIMAL TONGUE

This invention relates to an improved product and method for processing animal tongues, and more particularly to an improvement in the flavor of the product and to an improved method for removing the skin from animal tongues.

Based on a small U.S. consumers market for processed beef tongues, nearly all tongues are shipped as frozen, raw (green), whole tongues to Europe for subsequent processing as cured, canned, and cooked whole tongues for slicing at home or in delicatessen style markets. Obviously there exists a substantial economic advantage if this low-priced unprocessed item were converted into a higher priced consumer product for export.

One of the primary problem areas in the manual skinning step results from the higher U.S. labor cost involved. This is particularly true for beef tongues since they constitute the major economic segment of the market, and because the tougher beef skin not only increases the labor cost over that required for manual skinning for lamb and pork tongues but also has barred any substantial success in the application of mechanical skinning.

Available skinning machines are those used in vegetable skinning. Specifically they function on an abrasive principle; some have abrasive wheels which "rub off" the skin, while others have internal blades which contribute to the "rub off" process.

In addition to developing the process which makes mechanical skinning of animal tongues more practical and commercially competitive, this invention also realizes a substantial saving in shipping costs of such low-value waste products as trimmings, fat, skin, and bone.

Generally the processing of animal tongues consists of four basic steps: (1) curing, (2) pre-cooking, (3) stripping, (skinning), and (4) retorting. Curing involves pumping curing pickle into the tongue artery up to 50% of the green or raw weight of the tongue. The pumped tongue is placed into a pickle solution or bath and held 5 to 6 days at 40° to 45° F. Following pickle, the tongue is removed from the pickle bath, drained, and pre-cooked for 2-3 hours at 200°-205° F. The tongue is next skinned and prepared for retorting. The retorting step includes packing the skinned tongues in cans with added gelatin, sealed under vacuum, cooked (retorted) at 220° F. for about 3 hours, and thereafter water chilled to an internal temperature of below 100° F. This procedure is both slow and cumbersome in the area of pre-cooking and skinning.

The present invention has developed a method which overcomes shortcomings described above.

It was discovered that the pre-cook using water can be substituted by an acid hydrolysis which consists of immersing the tongue in an acid solution adjusted to pH between about 2.50 and 2.75 for a period of about 30 minutes. The tongue is then transferred to another tank of hot acid having a pH of between 2.5 and 2.75 and a temperature maintained at 200° to 205° F. for 40-45 minutes. This acid hydrolysis produces a softened skin suitable for the manual removal in about half the time required by a water pre-cook. In addition the application of acid together with a partial pre-cook (blanching) is successful in the mechanical peeling of the complete skin from beef tongue as well as pork and lamb tongue.

Therefore, it is an object of the present invention to provide an improved method for processing animal tongues.

Another object of the present invention is to provide a method for reducing the cost and time required for pre-cooking and stripping animal tongue.

Yet, another object of this invention is to provide an improved method for removing the skin from animal tongue.

Still another object of the present invention is to provide a method for an acid-treatment peeling process for both cured and uncured animal tongues.

Another object of the present invention is to provide an improved animal tongue product both cured and uncured having a highly desirable "tangy" flavor.

Further and additional objects will appear from the following descriptions and appended claims.

Generally the present invention relates to an improved method for processing animal tongues. Specifically it relates to an acid-treatment peeling process for cured and uncured animal tongues coupled with a partial pre-cook and an improved (tangy) flavor imparted to the product. The method embraces both artery and needle or stitch pumping of animal tongues.

In reviewing and testing the numerous approaches to the problem of breaking down the collagen layer binding the outer skin to the edible tissue, the application of acetic acid together with a partial pre-cook (blanching) was unexpectedly successful in perfecting the easy manual and/or mechanical removal of the complete skin from beef, lamb, and pork tongue.

Extensive testing and experimenting with a wide range of food acids, varied acid soaking, and acid solutions plus heat process combinations eventually produced a very specific set of handling conditions. This process was basically a 30 minute soak in acetic acid solution (bath) (pH 2.75±0.2) followed by a 45 minute cook in the same acid solution at 205° F. prior to peeling.

This process was successful for both cured and uncured tongues, and for both whole canned tongues and sectioned-and-formed canned tongues. The finished products were also tested by sensory or taste panels and each were found to have a residual tart or tangy flavor detectable by the panel members and was found highly desirable and preferable over the normal somewhat bland flavor.

While acetic acid is preferred, it should be noted that a wide range of other food acids can be employed; such as, citric, phosphoric, lactic, hydrochloric, and the like. In addition to the particular embodiments set forth below it will be understood by those skilled in the art that the application of this invention may be applied to most all processes presently in commercial use for the removal of skin from animal tongues.

Although most processing of animal tongues relate to four basic steps; namely, (1) curing, (2) pre-cooking, (3) stripping, and (4) canning, the following preferred embodiments are further subdivided for the purposes of clarity.

The first procedure covers the steps in processing artery-cured, acid-peeled, whole and canned beef tongues.

1. Raw tongues are thawed, if frozen.
2. Curing pickles are prepared:
   a. 30° Salometer for artery pump;
   b. 40° Salometer for cover pickle.

3. Tongues are artery pumped to 50% of their green weight with the 30° pickle.

4. Pumped tongues are put into cover pickle and held for 5 to 6 days at 40° to 45° F.

5. Tongues are removed from cover pickle, drained, and deboned, defatted, and trimmed.

6. Trimmed tongues are immersed for 30 minutes in a solution of acetic acid of pH 2.75±0.2.

This solution is prepared by adding approximately 2½ to 3 pounds of concentrated glacial acetic acid to 15 gallons of water. The mixture is stirred and checked for desired pH.

7. After soaking for 30 minutes, the tongues are transferred to a kettle containing a freshly prepared, simmering 200° to 205° F. acetic acid solution identical to that prepared in step 6. The temperature of the water-acid mixture is brought back up to 205° F., to compensate for temperature loss when tongues are added, and the tongues are held for 45–50 minutes.

8. The pre-cook tongues are removed from the acid bath and are skinned.

9. The skinned tongues are washed in cold, clean, continuous-flowing water for 10 minutes.

10. Skinned tongues are packed, 3 to 3½ tongues plus 2 tablespoons of gelatin, into 603×600 round cans. Weight should be 6 pounds 7 ounces.

11. The cans and lids are sealed under vacuum and retort cook processed at 220° F. for 2¾ hours, followed by a water chill to an internal product temperature of less than 100° F.

The second procedure covers the steps in processing needle injection-cured, acid-peeled, whole, and canned beef tongues.

1. Raw tongues are thawed, if frozen.
2. Curing pickles are prepared:
   a. 30° Salometer for pump pickle;
   b. 40° Salometer for cover pickle.
3. Tongues are needle injection pumped 50% of their green weight with the 30° pickle.

It is possible to substitute use of a 97° Salometer curing pickle for both pumping and covering pickles, if pumped at a 30% pump gain from green weight. This may be necessary if needle injection unit cannot achieve a 50% gain from green weight.

4. Pumped tongues are put into cover pickle.
   a. If pumped 50% with 30° Salometer pickle and 40° Salometer cover pickle is used, then hold tongues 5 to 6 days in cover pickle.
   b. If pumped 30% with 97° Salometer pickle is used for cover pickle, then hold tongues 3 to 4 days in cover pickle.

5. Tongues are removed from cover pickle, drained, and are deboned, defatted, and trimmed.

6. Trimmed tongues are immersed for 30 minutes in a solution of acetic acid of pH 2.75±0.2.

This solution is prepared by adding approximately 2½ to 3 pounds of concentrated glacial acetic acid to 15 gallons of water. Mixture is stirred and checked for desired pH.

7. After soaking for 30 minutes, the tongues are transferred to a kettle containing a freshly prepared simmering 200° to 205° F. acetic acid solution identical to that in Step 6. The temperature of the water-acid mixture is brought back up to 205° F. to compensate for temperature loss when tongues are added, and the tongues are held 45–50 minutes.

8. The pre-cooked tongues are removed from the acid bath and are skinned.

9. The skinned tongues are washed in cold, clean, continuous-flowing water for 10 minutes.

10. Skinned tongues are packed 3 to 3½ tongues plus 2 tablespoons of gelatin into 603×600 rounds cans. Weight should be 6 pounds 7 ounces.

11. The cans and lids are sealed under vacuum and retort cook processed at 220° F. for 2¾ hours, followed by a water chill to an internal product temperature of less than 100° F.

The third procedure covers the steps in processing needle injection-cured, acid-peeled, sectioned and formed, canned beef tongues:

1. Raw tongues are thawed, if frozen.
2. Curing pickles are prepared:
   a. 30° Salometer for pump pickle;
   b. 40° Salometer for cover pickle.
3. Tongues are needle injection pumped 50% of their green weight with the 30° pickle.

It is possible to substitute use of a 97° Salometer curing pickle for both pumping and covering pickles, if pumped at a 30° pump gain from weight. This may be necessary if needle injection unit cannot achieve a 50% gain from green weight.

4. Pumped tongues are put into cover pickle.
   a. If pumped 50% with 30° Salometer pickle and 40° Salometer cover pickle is used, then hold tongues 5 to 6 days in cover pickle.
   b. If pumped 30% with 97° Salometer pickle and same 97° Salometer pickle is used for cover pickle, then hold tongues 3 to 4 days in cover pickle.

5. Tongues are removed from cover pickle, drained, and are deboned, defatted, and trimmed. All lean trimmings which amount to approximately 16 to 18%, are saved for used in emulsion. (See step 10 below)

6. Trimmed tongues are immersed for 30 minutes in a solution of acetic acid of pH 2.75±0.2.

This solution is prepared by adding approximately 2½ to 3 pounds of concentrated glacial acetic to 15 gallons of water. Mixture is stirred and checked for desired pH.

7. After soaking for 30 minutes, the tongues are transferred to a kettle containing a freshly prepared, simmering 200° to 205° F. acetic acid solution identical to that prepared in step 6. The temperature of the water-acid mixture is brought back up to 205° F. to compensate for temperature loss when tongues are added, and the tongues are held for 45 to 50 minutes.

8. The pre-cooked tongues are removed from the acid bath and are skinned.

9. The skinned tongues are washed in cold, clean, continuous-flowing water for 10 minutes.

10. Emulsion Preparation:
   a. The lean trimmings (see step 5, above) are ground through a 1/16″ plate and chopped in a cut mix for 3 minutes.
   b. The emulsion is blended with (buffered) gelatin on a basis of 12 ounces/cwt. of emulsion in a vacuum mixer for 5 minutes.
   c. The washed, trimmed, whole tongues are put into a ribbon mixer with 16 to 18% of emulsion, based on weight of the whole tongues.

The emulsion is added to the tongues while the tongues are being agitated. Vaccuum mix the emulsion and tongues for 1½ minutes.

11. Stuff 408×408×1400 cans with this mixture, preferably using vacuumized stuffing unit.

12. The cans and lids are sealed under vacuum and retort cook processed at 220° F. for 2¾ hours, allowed by a water chill to an internal product temperature of less than 100° F.

The skinning in the above procedures was successfully accomplished by mechanical means. Manual skinning took half the time required for hot water pre-cooking procedures. Tongues from both lamb and pork were also processed employing the aforementioned procedures with equal success.

The acid pre-cook treatment can be applied to uncured animal tongues whenever a fresh, uncured tongue product is desired. The fresh tongue product also retains a characteristic tangy flavor which was found highly desirable.

It also follows that the acid pre-cook treatment may be applied to smoked tongue product with the same tangy flavor being evidenced in the final product.

In the foregoing specification, I have set forth a description of the invention for purpose of illustration and it will be apparent to those skilled in the art that numerous changes may be made without departing from the principles and spirit of the invention.

I claim:

1. A method of skinning whole animal tongues, comprising:

trimming the bone and excess fat from an unfrozen whole animal tongue, soaking the trimmed tongue in an unheated edible acid solution having a pH of 2.75±0.2 for 30 minutes, pre-cooking the soaked tongue in a hot edible acid solution maintained at 200° to 205° F. for 45 to 50 minutes and having a pH of 2.75±0.2, and skinning the pre-cooked tongue.

2. In the method of claim 1 wherein the tongue is beef.

3. In the method of claim 1 wherein the tongue is lamb.

4. In the method of claim 1 wherein the tongue is pork.

5. In the method of claim 1 wherein the tongue is skinned manually.

6. In the method of claim 1 wherein the tongue is skinned mechanically.

7. In the method of claim 1 wherein the edible acid is selected from the groups consisting of phosphoric, acetic, lactic, citric and hydrochloric.

8. In the method of claim 1 wherein the edible acid is acetic.

9. The product of claim 1 wherein the acid pre-cook imparts a desirable tangy flavor.

10. In the method of claim 1 wherein the unfrozen tongue prior to trimming, is first artery pumped with 30° Salometer pickle to 50% of the raw weight and thereafter held for 5 to 6 days at 40° to 45° F. in a 40° Salometer pickle bath.

11. In the method of claim 1 wherein the unfrozen tongue prior to trimming, is first needle pumped with 97° Salometer pickle to 30% of the raw weight and thereafter held for 3 to 4 days at 40° to 45° F. in a 97° Salometer pickle bath.

12. In the method of claim 1 wherein the unfrozen tongue prior to trimming, is first needle pumped with 30° Salometer pickle to 50% of the raw weight and thereafter held for 5 to 6 days at 40° to 45° F. in a 40° Salometer pickle bath.

13. In the method of claim 12 wherein, following skinning, the skinned tongue is canned, sealed under vacuum, and retort cook processed at 220° F. for 2¾ hours.

14. In the method of claim 12 wherein the trimming step includes the saving of lean trimmings of approximately 16 to 18% by weight of the tongue, and said lean trimmings are ground through a 1/16 inch hole plate and chopped to form an emulsion which is blended with 12 ounces of gelatin per hundred weight and thereafter mixed with the skinned tongues, stuffed into cans, sealed under vacuum and retort cook processed at 220° F. for 2¾ hours.

* * * * *